US008366123B2

(12) United States Patent
Horstman

(10) Patent No.: US 8,366,123 B2
(45) Date of Patent: Feb. 5, 2013

(54) BUGGY JACK

(76) Inventor: Ronald Lee Horstman, Lakeside, CA (US)

( * ) Notice: Subject to any disclaimer, the term of this patent is extended or adjusted under 35 U.S.C. 154(b) by 0 days.

(21) Appl. No.: 13/199,680

(22) Filed: Sep. 7, 2011

(65) Prior Publication Data

US 2012/0068425 A1 Mar. 22, 2012

Related U.S. Application Data

(60) Provisional application No. 61/403,449, filed on Sep. 16, 2010.

(51) Int. Cl.
*B60S 9/02* (2006.01)

(52) U.S. Cl. .................................. 280/6.155; 280/47.41

(58) Field of Classification Search ............... 280/6.155, 280/47.41, DIG. 7; 16/44
See application file for complete search history.

(56) References Cited

U.S. PATENT DOCUMENTS

| | | | | | |
|---|---|---|---|---|---|
| 2,636,715 | A | * | 4/1953 | Griffin | 254/1 |
| 3,606,246 | A | * | 9/1971 | Harrah | 254/2 B |
| 3,758,128 | A | * | 9/1973 | Stenwall | 280/47.25 |
| 3,771,809 | A | * | 11/1973 | Carn | 280/47.331 |
| 4,005,850 | A | * | 2/1977 | Myers et al. | 254/2 R |
| 4,226,401 | A | * | 10/1980 | Coulombe | 254/2 B |
| 6,217,044 | B1 | * | 4/2001 | Beeche et al. | 280/43 |

OTHER PUBLICATIONS

Hot N Ride, Hot Rides's Off Road Desert & Sand Jack, Internet Advertisement, 2009, last accessed at http://utvweekly.com/index.php/2009/12/hot-ride-soft-soil-desert-sand-jack/ ; 5 pages.

Sand Sports, Jan./Feb. 2011, Buggy Jack (First Article Published for Buggy Jack), 4 pages.

2011 Product Catalog, San Diego Ride Concepts, "Home of the Buggy Jack", available at www.sandiegorideconcepts.com; 6 pages.

* cited by examiner

*Primary Examiner* — J. Allen Shriver, II
*Assistant Examiner* — Bryan Evans
(74) *Attorney, Agent, or Firm* — Maymanat S. Afshar

(57) ABSTRACT

The Buggy Jack is used to transport a conventional automobile floor-type hydraulic jack across rough, sandy or otherwise unstable, loose terrain, and rolls it into position below a vehicle that requires inspection, maintenance or repairs even on rough or sandy terrain.

20 Claims, 2 Drawing Sheets

AXLE W/O LOAD
1/4" = 1"

AXLE UNDER LOAD
1/4" = 1"

BUGGY JACK

This application claims the benefit of U.S. Provisional Application No. 61/403,449, filed Sep. 16, 2010.

BACKGROUND

A conventional automobile floor-type hydraulic jack cannot readily be used on rough or sandy terrain. The problem is that automobile floor-type hydraulic jacks have small-diameter rigid steel wheels that are suitable only for rolling across concrete slab garage floors, but not suitable for rolling across rough terrain; hence, such conventional floor-type hydraulic jacks are not suitable for outdoor use in field conditions. In rough terrain, the small-diameter rigid steel wheels sink into loose or sandy soils and the conventional automobile floor-type hydraulic jack cannot therefore be rolled into position below the undercarriage of a vehicle that requires inspection, maintenance or repairs.

SUMMARY OF THE INVENTION

In one embodiment, the present invention comprises a conveyance to enable the use of an automobile floor-type hydraulic jack on loose, rough or sandy level ground comprising a main frame, at lease three vertical support struts, wherein each of said vertical support struts further comprises a foot disposed on the bottom of each strut, an axle, two front wheels attached at the opposite end of said axle, a support frame, and one rear wheel attached to said support frame, wherein each of said wheels has a pneumatic tire mounted thereon, and a means for detachably fastening an automobile floor-type hydraulic jack to the main frame.

In another embodiment, at least one of said main frame, said vertical support struts, or said support frame further comprises cold rolled rectangular steel tubing, aluminum alloy, titanium or carbon fiber.

In yet another embodiment, said main frame and said support frame further comprise cold rolled rectangular steel tubing.

In a further embodiment, each of said vertical support struts further comprises cold rolled rectangular steel tubing and an end cap comprising hot rolled flat steel plate.

In another embodiment, said vertical support struts are an appropriate length so that said vertical support struts are short enough to clear the ground when the automobile floor-type hydraulic jack is not in use, but long enough so that said vertical support struts come into positive bearing upon the surface of the ground when the automobile floor-type hydraulic jack is in use.

In another embodiment, said vertical support struts comprise a length of about 2¾ inches.

In yet another embodiment, said means for detachably fastening an automobile floor-type hydraulic jack comprises positioning pins.

In still a further embodiment, said rear wheel comprises a fixed or pivoting wheel.

In another embodiment, said rear wheel comprises a pivoting wheel.

In yet another embodiment, said wheels are of an appropriate diameter so that the conveyance with the automobile floor-type hydraulic jack mounted thereon may be rolled below the undercarriage of the vehicle that is to be lifted by means of subsequent operation of the automobile floor-type hydraulic jack.

In another embodiment, said front and rear wheels have a diameter of about 4 inches.

In yet another embodiment, said wheels are of an appropriate diameter so that said vertical support struts do not impact the ground—when the automobile floor-type hydraulic jack is not in use, thereby permitting the conveyance with the automobile floor-type hydraulic jack mounted thereon to be rolled across the surface of the ground, unhindered by said vertical support struts.

In still another embodiment, where said tires are fully inflated, the distance measured between the ground and the bottom of the feet of said vertical support struts is about 1 to 1.5 inches.

In a further embodiment, each of said tires has a pressure of about 20 psi.

In yet another embodiment, said wheels are fitted with pneumatic tires of appropriate diameter, width, and air pressure so as to allow the conveyance with the automobile floor-type hydraulic jack mounted thereon to be rolled across rough or sandy ground when the automobile floor-type hydraulic jack is not in use, by means of pushing or pulling on the handle, without allowing the footings to drag across the rough terrain or allowing the tires to subside into loose or sandy soil.

In another embodiment, each of said pneumatic tires measures about 10 inches in diameter, about 3 inches in width, and is inflated with air pressure of about 20 psi so as to deform under the load imposed by the additional weight of the vehicle when said vehicle is lifted by operation of the automobile floor-type hydraulic jack, so as to cause said vertical support struts to come into positive bearing upon the surface of the ground when the automobile floor-type hydraulic jack is in use.

In a further embodiment, each of said pneumatic tires has a diameter of about 10 inches.

In still another embodiment, said conveyance is able to withstand a maximum load of about 3000 pounds.

In one embodiment, the present invention comprises a conveyance to enable the use of an automobile floor-type hydraulic jack on loose, rough or sandy level ground comprising a main frame, at least two vertical support struts, wherein each of said vertical support struts further comprises a foot disposed on the bottom of each of said vertical support strut, an axle, two front wheels attached at opposite ends of said axle, a support frame, one rear wheel attached to said support frame, wherein each of said wheels has a pneumatic tire mounted thereon, and a means for detachably fastening an automobile floor-type hydraulic jack to said main frame.

In yet another embodiment, the present invention comprises a conveyance to enable the use of an automobile floor-type hydraulic jack on loose, rough or sandy level ground comprising a frame, at least two vertical support struts, wherein each of said vertical support struts further comprises a foot disposed on the bottom of each of said vertical support struts, an axle, at least two wheels, wherein each of said wheels has a pneumatic tire mounted thereon, and a means for detachably fastening an automobile floor-type hydraulic jack to said frame.

BRIEF DESCRIPTION OF THE FIGURES

The disclosed subject matter of the present application will now be described in more detail with reference to exemplary embodiments of the Buggy Jack, given only by way of example, and with the accompanying drawings, in which.

DETAILED DESCRIPTION OF THE FIGURES

Referring to the figures, numerals designate identical or corresponding elements throughout the figures and this application.

Figure 1:
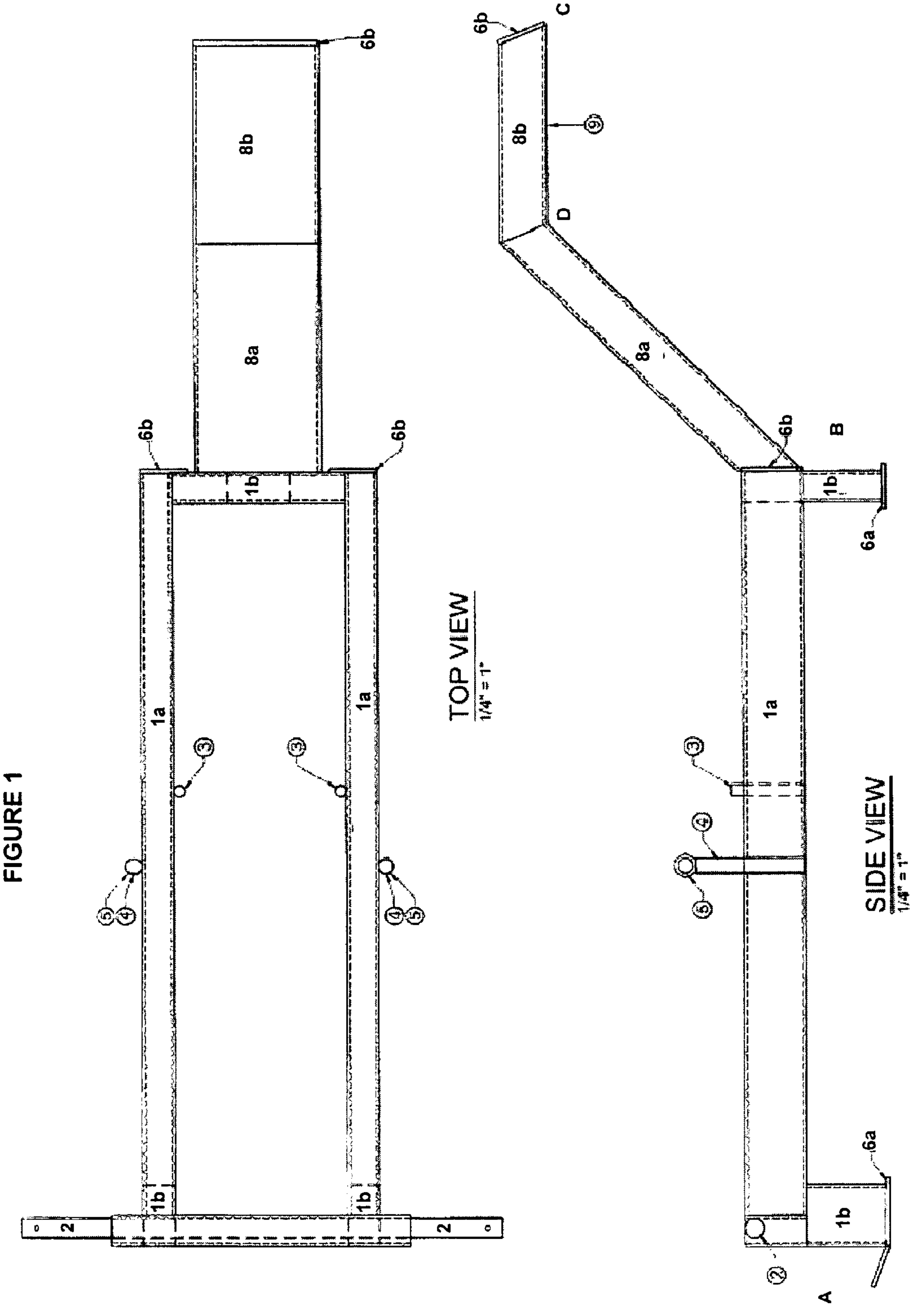
FIG. 1 depicts a top view and a side view according to an embodiment of the disclosed subject matter.

FIG. 1 depicts a top and side view of the Buggy Jack (sometimes also referred to as a dolly). The Buggy Jack frame comprises a front portion A, a rear portion B, and a tail section C. The main frame 1*a* rests on the vertical support struts 1*b*, which are made of, for example, 1 inch×2 inch 13 gauge cold rolled steel tubing. Other similar materials, such as titanium, aluminum, alloy metal, or carbon fiber, may also be used. In an embodiment, the vertical support struts 1*b* comprise a length of about 2¾ inches. The main frame 1*a* is connected to the vertical struts 1*b* via welded joints or other fastening methods. In an embodiment, the Buggy Jack comprises three struts 1*b*, with two struts 1*b* located at opposing corners of front portion A and one strut 1*b* located midway on rear portion B as indicated in FIG. 1 side view and top view.

The axle 2 (shown on FIGS. 1 and 2) is used for attachment of two front wheels 7*a* (not shown). The front wheels 7*a* are attached to the opposite ends of the axle 2. The axle 2 is made of, for example, ⅝ inch cold rolled solid round steel dowel. Other similar materials, such as titanium, aluminum, alloy metal, or carbon fiber, may also be used.

Positioning pins 3 hold the hydraulic jack in place when such hydraulic jack is attached to the Buggy Jack. The pins 3 are made of, for example, ⅜ inch cold rolled solid round steel dowel. Other similar materials, such as titanium, aluminum, alloy metal, or carbon fiber, may also be used.

The structural spacer 4 carries the nut 5 that knob 5*b* (not shown) is threaded through to hold the hydraulic jack in place. Spacer 4 is made of, for example, ½ inch cold rolled round steel tubing. Other similar materials, such as titanium, aluminum, alloy metal, or carbon fiber, may also be used.

The nut 5 is, for example, a ½ inch 13 gauge zinc hex nut. The hydraulic jack is attached to the main frame 1*a*, for example, with a fluted ½ inch diameter×1¼ inch long, #13 knob 5*b*, which knob 5*b* fits, for example, into a pre-existing counter-sunk hole in the side rails of the aluminum 1½ ton aluminum racing jack.

Three vertical support struts 1*b*, two at each bottom front corner and one at the rear portion of the main frame 1*a*, rest on feet 6*a* (also known as end caps). Caps 6*b* are used for closing the open ends of the tubing, at the rear portion B of frame 1*a* and at the tail section C of support frame 8. Feet 6*a* and caps 6*b* are made of, for example, ⅛ inch×1½ inch hot rolled flat stack. Other similar materials, such as titanium, aluminum, alloy metal, or carbon fiber, may also be used.

Wheels 7*a* (not shown) are mounted onto the opposing ends of the axle 2. Each individual wheel 7*a* is attached to axle 2 by cotter pins, or other appropriate attachment mechanisms. The wheels 7*a* are typically 4 inches in diameter, and also each wheel 7*a* has a single tire 7*b* mounted thereon, where such tires 7*b* are, for example, 10 inch pneumatic tires.

The tires 7*b* (FIG. 2), in an embodiment, comprise 10 inch pneumatic tires, with 3 inch width and approximately 30 psi per tire when filled with air. The tires 7*b* may have slightly less pressure, in order to accommodate lighter loads, but preferably are filled with a minimum of about 20 psi of air to avoid causing the tires to pinch against the wheels and thus causing a puncture leak in the tires 7*b*. Other appropriate air pressures may be used where other similar tire sizes are employed. While pneumatic tires are one example of deformable tires for use in the invention, other similarly deformable tires may also be used. For example, partially deformable tires that are also referred to as run-flat tires may be employed in the invention. Other materials that are used in producing similar tires may also be used, provided the tires are deformable when a load is applied during operation of the Buggy Jack.

The support frame 8 serves as a support for rear wheel 9. The support frame 8 comprises, in one embodiment, two sections welded together at position D. Section 8*a* is connected to the main frame 1*a* by means of welding (FIG. 1, side view) at an approximate angle of 45° and section 8*b* is connected via welding at position D to section 8*a* at an approximate angle of 37°. Furthermore, the cut on the unattached end of 8*b* is also at an approximate angle of 37°. These size welds result in an approximate angle of 135° rise of 8*a* to connect to 8*b*. The support frame 8 is made of, for example, 1½ inch×4 inch×0.095 inch 13 gauge cold rolled rectangle steel tubing. Other similar materials, such as titanium, aluminum, alloy metal, or carbon fiber, may also be used. Section 8*a* of the support frame 8 is connected to the rear portion B of the main frame 1*a* which rests on the vertical support strut 1*b*.

The rear wheel 9 comprises a 4 inch wheel with caster 10 (not shown) having a 10 inch pneumatic tire 7*b* mounted thereon and a 4 inch mounting plate 11 (not shown) mounted on the lower surface of section 8*b* of the tail section C (not shown). The rear wheel 9 can pivot in multiple directions during operation of the Buggy Jack, facilitating the positioning of the Buggy Jack under the undercarriage of a vehicle.

Figure 2:
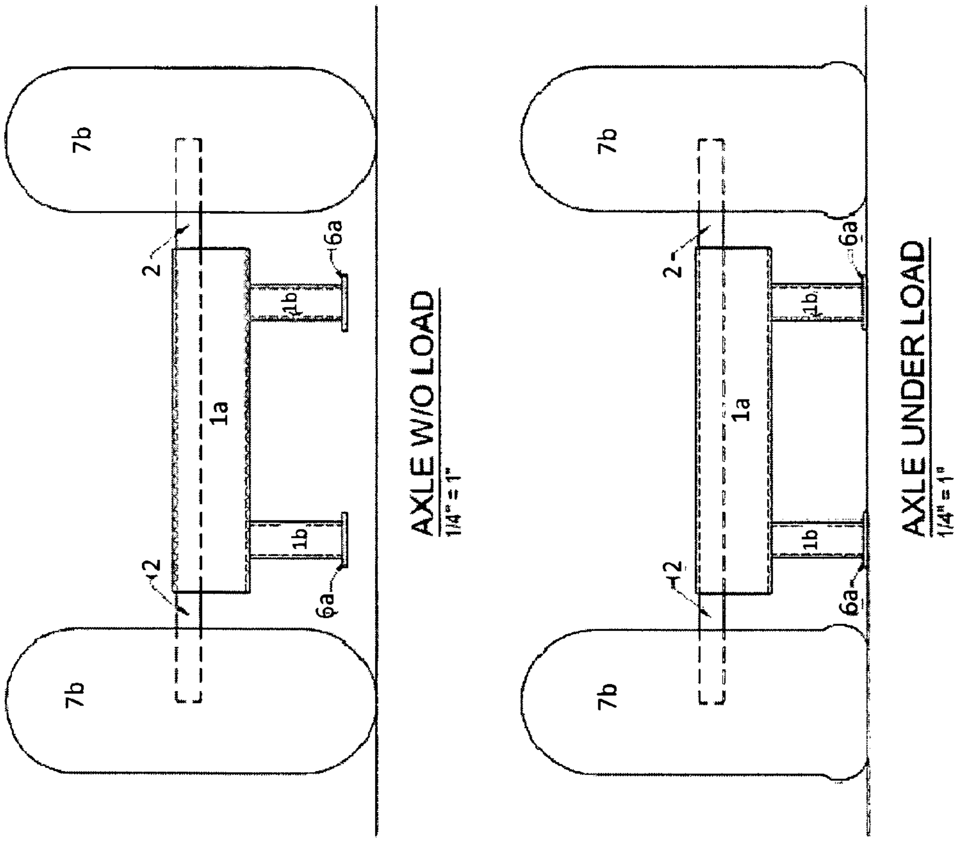
FIG. 2 depicts a view of an axle without load and an axle under load mechanism made in accordance with the principles of the disclosed subject matter.

FIG. 2 depicts a view of the axle 2 without load and an axle 2 under load. During operation of the Buggy Jack, the initial shape of the tires 7*b* is compressed to conform to the shape of the underlying ground surface by the combined weight of the hydraulic jack plus the weight of the vehicle's undercarriage (not shown). The imposed load on the hydraulic jack/Buggy Jack combination causes the tires 7*b* to deform into the shape of two half circles.

DETAILED DESCRIPTION OF THE INVENTION

The present invention called the Buggy Jack with large 10 inch diameter pneumatic tires 7*b* solves the aforementioned problem. The Buggy Jack is used to transport a conventional automobile floor-type hydraulic jack, for example, a Central Hydraulics 1½ Ton Low Profile Aluminum Racing Jack, or the like, across rough or sandy terrain, and rolls the hydraulic jack into position below a vehicle that requires inspection, maintenance or repairs even on rough or sandy terrain. Another novel feature of the conveyance is a set of vertical support struts 1*b* (also known as footings) that are short enough not to drag across rough or sandy terrain when the combination of the Buggy Jack plus automobile floor-type hydraulic jack are rolled into position below the vehicle, yet long enough to come into positive bearing with the surface of the ground when the hydraulic jack is used to raise the vehicle. The term footing is sometimes used to refer to the vertical support and the foot that the vertical support strut is disposed on. Taken together, these two features, the pneumatic tires 7*b* and the vertical support struts 1*b*, provide a pneumatic mechanism for a smooth transition of the load transfer from the pneumatic tires in the "unloaded" condition, to the set of vertical support struts 1*b* in the "loaded" condition. This smooth load transfer occurs during continuous operation of the hydraulic jack when it is mounted on the Buggy Jack and used to raise a vehicle on rough, sandy, or otherwise unstable or loose ground.

The smooth load transfer is afforded by the load-deformation characteristics of the pneumatic tires 7*b* and the 1½ inch clearance between the vertical support struts 1*b* and the underlying ground surface. The smooth transition is further facilitated by the increasing load-bearing capacity of the sandy or otherwise unstable or loose soil beneath the vertical support struts 1*b* as slight settlements of the vertical support struts 1*b* occur with initial vertical loading. As the hydraulic jack is used to raise the undercarriage of the vehicle, the combined weight of the hydraulic jack plus vehicle is transferred to the Buggy Jack vertical struts 1*b* as well as to the pneumatic tires 7*b*. Under this combined load, the vertical support struts 1*b* subside slightly into the sandy or unstable/loose soil below.

Together, the elastic deformation of the pneumatic tires (tires remain elastic because they are not bearing the load) plus the plastic deformation of the soil below the vertical support struts 1*b*, avoid the problem of sudden impact loading that would otherwise cause sudden soil subsidence and partial collapse if a conventional hydraulic jack were singly used to raise a vehicle on loose or sandy terrain.

The Buggy Jack works with, for example, a Central Hydraulics 1½ Ton Low Profile Aluminum Racing Jack, item#47246. Another example of a hydraulic jack that may be used with the invention is a Rapid Pump® 1½ Ton Lightweight Aluminum Racing Jack, item #68054.

The anticipated maximum load of the Buggy Jack is about 3,000 pounds, with a minimum load clearance of about 10.25 inches. The Buggy Jack saddle height (i.e. how high the Buggy Jack itself will rise from the ground, a height that is extended with the use of the Buggy Jack cart) is about 8.29 inches at a minimum, and about 21.59 inches at a maximum. In an embodiment, the length of the Buggy Jack is about 44.5 inches at a minimum, and about 49.5 inches at a maximum. In another embodiment, the width of the Buggy Jack is about 17 inches, with a height of about 13.5 inches. The approximate weight of the Buggy Jack is 35 pounds, but such weight and other dimensions may vary depending on customized materials used to construct the Buggy Jack. For example, titanium, aluminum, steel, high strength mild steel, carbon fiber, or other metals or alloys may be employed to construct the Buggy Jack, and thus the Buggy Jack weight will vary accordingly. However, the Buggy Jack is designed to be lightweight and portable, thus relevant materials to be used should conform to this desired embodiment characteristic. These example specifications may vary depending on the floor jack model used in tandem with the Buggy Jack. It is to be understood by one of ordinary skill in the art that the Buggy Jack dimensions may vary depending on the floor jack used, and such variations are considered within the reasonable scope of the invention as described herein.

The following structural analysis of the load-deformation behavior of pneumatic tires is applicable to tires of initially round cross section, as is the case with the 10 inch pneumatic tires.

Before loading, the round cross section of the tire has a certain mass of air in it such that it has radius $r_0$ and internal pressure $P_0$.

The initial dimensions and parameters of the pneumatic tires are as follows:

Tire diameter=10 inches

Wheel diameter=4 inches

Outer radius of the tire torus, $r_0$=1⅕ inches

Diameter of circular cross-section of the tire torus, $2r_0$=3 inches

Diameter of the tire=4 inches (wheel diameter)

Inner diameter of the tire torus=4 inches (wheel diameter)

Principal radius of the tire torus, R=2+(3)/2=3½ inches

Un-deformed volume of the tire torus, $V=2\pi^2 R r_0^2=155$ cubic inches

Weight on tire=W pounds

Air pressure in tire=P (psi—pounds per square inch)

Recommended air pressure within the tire=15 to 20 psi

Maximum air pressure within the tire=24 psi

In the absence of any imposed load, the area of the circular cross section of the bottom half of the un-deformed tire, taken through the centroid of area of the contact between the tire and the ground surface, is given by the familiar expression:

$$A_0=\pi r_0^2 \quad \text{(Eq. 1)}$$

whereas the perimeter, S, of the tire torus (i.e., the circular cross-section of the tire) is simply:

$$S=2\pi r_0 \quad \text{(Eq.2)}$$

The initial shape of the tire (i.e., the torus) is compressed to conform to the shape of the underlying ground surface by the combined weight of the automobile floor-type jack plus the weight of the vehicle's undercarriage. As a result of this imposed load, the cross section of the tire taken through the centroid of the area of contact between the tire and the ground surface deforms into the shape of two half-circles with cross-section of radius $r_f$ separated by a distance of $r_c$, where $r_c$ represents the radius of the contact area between the tire and the surface of the ground.

After being compressed by an imposed vertical load, the cross section of the tire (taken through the centroid of area of contact between the tire and the ground) has an area equal to the following:

$$A_f=\pi r_r^2+4r_c r_f \quad \text{(Eq. 3)}$$

and the perimeter, S, of the deformed tire (taken through the centroid of area of contact between the tire and the round) is given by the expression:

$$S=2\pi r_f+4r_c \quad \text{(Eq. 4)}$$

Despite such a topological deformation, the surface area of the tire remains constant. Therefore, $$2\pi r_0=2r_f+4r_c \quad \text{(Eq. 5)}$$

This equality (Eq. 5) implies that $$2\pi(r_0-r_f)=4r_c \quad \text{(Eq. 6)}$$

The change in the height of the tire, $\Delta h=2\ (r_0-r_f)$ is therefore given by the following expression:

$$\Delta h=(4r_c)/\pi. \quad \text{(Eq. 7)}$$

The change in the volume, ΔV, of the tire can be reasonably approximated by the volume of a cone of height Δh with base of radius $r_c$. The volume change, ΔV, is therefore given by the expression:

$$\Delta V=\Delta h \pi r_c^2/3. \quad \text{(Eq.8)}$$

The term, Δh, can be eliminated from Eq. 8 by means of Eq. 7, giving:

$$\Delta V=(\Delta h)^3\pi^3/48. \quad \text{(Eq. 9)}$$

Of course, a decrease in the volume of the tire accompanies deformation, and with that comes a corresponding increase in tire pressure, ΔP, assuming constant temperature.

The contact area $A_c$ between the tire and the surface of the ground is given by the following expression:

$$A_c=\pi r_c^2=(\Delta h)^2\pi^3/16. \quad \text{(Eq. 10)}$$

Obviously, the total weight imposed upon the tire must equal the tire pressure times the contact area, so the vertical deformation, Δh, may readily be expressed in terms of the total imposed load, namely the tire pressure, P, times the contact area, $A_c$.

The equation for equilibrium is therefore:

$$\text{Force}=P(\Delta h)^2\pi^3/16. \quad \text{(Eq. 11)}$$

Assuming an initial air pressure in the tire of 20 psi, the vertical deformation may be calculated as a function of the imposed weight on the tire.

For different values of vertical deformation, Δh, tabulated values of W, ΔV and ΔP and the contact area $A_c$, are calculated as follows:

| | Vertical Deformation (Δh), inches | Contact Area (Ac), square inches | Pressure, psi | Weight, pounds |
|---|---|---|---|---|
| Case 1 | 0.5 | 0.48 | 20 | 20 × 0.48 = 9.6 |
| Case 2 | 1.0 | 1.9 | 20 | 20 × 1.9 = 38 |
| Case 3 | 1.5 | 4.35 | 21 | 21 × 4.35 = 91 |
| Case 4 | 2.0 | 7.7 | 22 | 22 × 7.7 = 169 |
| Case 5 | 2.5 | 12.1 | 24 | 24 × 12.1 = 290 |

Thus, before exceeding the safe operating limits of the 10-inch diameter pneumatic tires, the Buggy Jack will have deformed at least 1 to 1½ inches, thereby allowing the load transfer onto the vertical support struts. For instance, if the Buggy Jack were operated on firm level ground, the vertical support struts would come into contact with the ground when a total of 91 pounds was reached.

If the ground were slightly uneven and an additional ½ inch of deformation were needed to engage the vertical struts, then the vertical struts would come into contact with the ground when a total wheel load of 161 pounds was reached.

If the ground were very uneven and an additional inch of deformation were needed to engage the vertical support struts, then the vertical struts would come into contact with the ground when a total wheel load of 290 pounds was reached.

Under normal operating conditions, therefore, the wheel load capacity of 300 pounds is not expected to be exceeded.

The second part of the structural analysis consists of the calculation of the bearing capacity of the vertical struts on loose soil (ϕ=25°) of low cohesion (c=100 psf). Recall that, slight plastic deformation of the sand below the vertical struts is useful insofar as these plastic deformations contribute to the smooth load transfer between the wheels and the struts, thereby reducing the potential for sudden soil subsidence or collapse.

The limit state of the sandy soils of low cohesion below the vertical support strut has been previously Identified by others. [Terzaghi, K. 1943. *Theoretical Soil Mechanics*. New York: John Wiley & Sons &. Meyerhof, G. G. (1953); *The bearing capacity of foundations under eccentric and inclined loads*. Proc. 3rd Int. Conf. Soil Mech. Found. Engng, Zurich 1, 440-445.

The generally-accepted model for "the shear failure of shallow footings supported by loose sands with low cohesion relies upon an inclined facture plane below the footing" is presented in graphical format in NAVFAC DM 7.02 or DM 7.2, 1 Sep. 1986, FIG. 1.

For the purpose of this analysis, we evaluate the ultimate bearing capacity, $Q_{ult}$, in terms of the unit weight of the soil, Y, the cohesion, C, of the soil, and the dimensions of the footing, B and L, and the soil capacity factors parameters $N_c$ and $N_y$, per the following equation:

$$Q_{ult}=CN_c+(1+0.3B/L)+DN_a+0.4YBN_y$$

where

B=1½ inches=0.125 ft;

where

L=3 inches=0.25 ft;

where

B/L=0.5 (0.5 width-to-Length ratio of these rectangular footings)

where

Y=105 pcf (assume that the unit weight of the soil is 105 pcf)

where c=100 psf (assume that the cohesion is 100 psf); and

D is the depth of the footing in feet; assumed to be zero (D=0) initially.

The bearing factor, $N_y$, is defined in, NAVFAC DM 7.02 or DM 7.2, 1 Sep. 1986, FIG. 1. In the case of loose desert sand, we assume that the friction angle is 25° and that the cohesion is zero. In such a case we have:

$$N_y=7.$$

The bearing capacity factor, $N_c$, is defined in NAVFAC DM 7.02 or DM 7.2, 1 Sep. 1986, FIG. 1, as follows:

$$N_c=21$$

Thus, before any settlement has occurred, the bearing capacity is given by the following expression:

$$Q_{ult}=cN_c+(1+0.3B/L)+DN_a+0.4YBN_y$$

$$Q_{ult}=(100)(25)+(1.15)+(0.4)(105)(2)(18)=2{,}500+1{,}512=4{,}012 \text{ psf}$$

The dimensions of the footings are 1½ inch×3 inches=0.03 sq. ft.

Manner and Process of Using the Invention

The Buggy Jack (conveyance) is to be used in connection with an automobile-type hydraulic floor jack in the following manner:

Step 1 Place a Central Hydraulics 1½ Ton Low Profile Aluminum Racing Jack or other similarly dimensioned conventional automobile floor-type hydraulic jack on top of the Buggy Jack and secure it by means of the set screws.

Step 2 The Buggy Jack is to be used on rough, but level ground. The Buggy Jack should not be used on ground sloped more than 10 degrees from level. Inspect the surface of the ground to ensure that it is within 10 degrees of level.

Step 3 Locate the Buggy Jack and automobile-type hydraulic floor jack below the vehicle by means of pushing or pulling the handle of the jack.

Step 4 Inspect the undercarriage of the vehicle to ensure that the point-of-contact between the hydraulic jack and the vehicle will not compress hydraulic hoses, compress fuel lines, damage electrical lines or otherwise damage delicate mechanical parts of the vehicle.

Step 5 Operate the Central Hydraulics 1½ Ton Low Profile Aluminum Racing Jack, as per manufacturer's specifications, until initial contact is made between the automobile-type hydraulic floor jack and the undercarriage of the vehicle.

Step 6 Re-inspect the undercarriage of the vehicle to confirm that the point-of-contact between the hydraulic jack and the vehicle does not compress hydraulic hoses, compress fuel lines, or damage electrical lines or otherwise damage delicate mechanical parts of the vehicle.

Step 7 Be mindful that as the automobile-type hydraulic floor jack initially raises the undercarriage of the vehicle, the Buggy Jack will be displaced forward and backward by means of rolling of the wheels of the Buggy Jack.

Step 8 As the automobile-type hydraulic floor jack initially raises the undercarriage of the vehicle, the pneumatic wheels of the Buggy Jack deform and allow the vertical support struts (footings) located below the Buggy Jack to come into contact with the surface of the ground.

Step 9 Further use of the automobile-type hydraulic floor jack and, correspondingly further deformation of the pneumatic tires, causes the combined weight of the Buggy Jack plus automobile-type hydraulic floor jack plus vehicle to be transferred, in part, to the set of vertical struts. Therefore, do not dig or otherwise disturb the ground in the vicinity of the vertical struts or wheels of the Buggy Jack because soil subsidence and partial collapse could result.

Step 10 Before commencing inspections or repairs or maintenance on the vehicle, install floor stands securely below the undercarriage of the vehicle as per manufacturer's recommendations.

Step 11 Slowly transfer the weight of the vehicle to the floor stands by means of lowering the hydraulic jack before removing the Buggy Jack.

Step 12 Once the floor stands are in place below the vehicle, remove the Buggy Jack and hydraulic jack before commencing inspections or repairs or maintenance on the vehicle.

The disclosed subject matter has been described in detail with reference to exemplary embodiments thereof; it will be apparent to one skilled in the art that various changes can be made, and equivalents can be used, without departing from the scope of the disclosed subject matter. Each of the aforementioned documents is incorporated by reference herein in its entirety.

The invention claimed is:

1. A conveyance for use with an automobile floor-type hydraulic jack on loose, rough or sandy level ground, said conveyance comprising:

(i) a main frame;

(ii) at least three vertical support struts, wherein each of said vertical support struts further comprises a foot disposed on the bottom of each of said vertical support struts;

(iii) an axle, wherein said axle is fixed relative to said main frame;

(iv) two front wheels attached at opposite ends of said axle;

(v) a support frame comprising a first member extending upwardly at an angle from the main frame and a second member extending from the first member parallel and above the main frame;

(vi) one rear wheel attached to said support frame, wherein the rear wheel is a swivel caster;

(vii) wherein each of said front and rear wheels has a pneumatic tire mounted thereon; and (viii) a means for detachably fastening an automobile floor-type hydraulic jack to said main frame;

(ix) wherein said pneumatic tires and said vertical support struts together provide a pneumatic mechanism for a smooth transition of the load transfer from said pneumatic tires in an unloaded condition, to the set of said vertical support struts in a loaded condition.

2. The conveyance of claim 1, wherein at least one of said main frame, said vertical support struts, or said support frame further comprises cold rolled rectangular steel tubing, aluminum alloy, titanium or carbon fiber.

3. The conveyance of claim 1, wherein said main frame and said support frame further comprise cold rolled rectangular steel tubing.

4. The conveyance of claim 1, wherein each of said vertical support struts further comprises cold rolled rectangular steel tubing and an end cap comprising hot rolled flat steel plate.

5. The conveyance of claim 1, wherein said vertical support struts are an appropriate length so that said vertical support struts are short enough to clear the ground when the automobile floor-type hydraulic jack is not in use, but long enough so that said vertical support struts come into positive bearing upon the surface of the ground when the automobile floor-type hydraulic jack is in use.

6. The conveyance of claim 1, wherein said vertical support struts comprise a length of about 2¾ inches.

7. The conveyance of claim 1, wherein said means for detachably fastening an automobile floor-type hydraulic jack comprises positioning pins.

8. The conveyance of claim 1, wherein said rear wheel comprises a fixed or pivoting wheel.

9. The conveyance of claim 1, wherein said rear wheel comprises a pivoting wheel.

10. The conveyance of claim 1, wherein said wheels are of an appropriate diameter so that the conveyance with the automobile floor-type hydraulic jack mounted thereon may be rolled below the undercarriage of the vehicle that is to be lifted by means of subsequent operation of the automobile floor-type hydraulic jack.

11. The conveyance of claim 1, wherein said front and rear wheels have a diameter of about 4 inches.

12. The conveyance of claim 1, wherein said wheels are of an appropriate diameter so that said vertical support struts do not impact the ground—when the automobile floor-type hydraulic jack is not in use, thereby permitting the conveyance with the automobile floor-type hydraulic jack mounted thereon to be rolled across the surface of the ground, unhindered by said vertical support struts.

13. The conveyance of claim 1, wherein when said tires are fully inflated, the distance measured between the ground and the bottom of the feet of said vertical support struts is about 1 to 1.5 inches.

14. The conveyance of claim 1, wherein each of said tires has a pressure of about 20 psi.

15. The conveyance of claim 1, wherein said wheels are fitted with said pneumatic tires of appropriate diameter and width and air pressure so as to allow the conveyance with the automobile floor-type hydraulic jack mounted thereon to be rolled across rough or sandy ground when the automobile floor-type hydraulic jack is not in use, by means of pushing or pulling on the handle, without allowing the footings to drag across the rough terrain or allowing the tires to subside into loose or sandy soil.

16. The conveyance of claim 1, wherein each of said pneumatic tires measures about 10 inches in diameter, about 3 inches in width, and is inflated with air pressure of about 20 psi so as to deform under the load imposed by the additional weight of the vehicle when said vehicle is lifted by operation of the automobile floor-type hydraulic jack, so as to cause said vertical support struts to come into positive bearing upon the surface of the ground when the automobile floor-type hydraulic jack is in use.

17. The conveyance of claim 1, wherein each of said pneumatic tires has a diameter of about 10 inches.

18. The conveyance of claim 1, wherein said conveyance weighs approximately 35 pounds and is able to withstand a maximum load of about 3000 pounds.

19. A conveyance for use with an automobile floor-type hydraulic jack on loose, rough or sandy level ground, said conveyance comprising:

(i) a main frame;

(ii) at least two vertical support struts, wherein each of said vertical support struts further comprises a foot disposed on the bottom of each of said vertical support strut;

(iii) an axle, wherein said axle is fixed relative to said main frame;

(iv) two front wheels attached at opposite ends of said axle, (v) a support frame comprising a first member extending upwardly at an angle from the main frame and a second member extending from the first member parallel and above the main frame;

(vi) one rear wheel attached to said support frame, wherein the rear wheel is a swivel caster;

(vii) wherein each of said front and rear wheels has a pneumatic tire mounted thereon; and (viii) a means for detachably fastening an automobile floor-type hydraulic jack to said main frame.

(ix) wherein said pneumatic tires and said vertical support struts together provide a pneumatic mechanism for a smooth transition of the load transfer from said pneumatic tires in an unloaded condition, to the set of said vertical support struts in a loaded condition.

20. A conveyance for use with an automobile floor-type hydraulic jack on loose, rough or sandy level ground said conveyance comprising:

(i) a frame;

(ii) at least two vertical support struts, wherein each of said vertical support struts further comprises a foot disposed on the bottom of each of said vertical support struts, (iii) an axle, wherein said axle is fixed relative to said frame A support frame comprising a first member extending upwardly at an angle from the frame and a second member extending from the first member parallel and above the frame;

(iv) at least two wheels, attached at opposite ends of said axle and a rear swivel caster wheel attached to the support frame, wherein each of said wheels has a pneumatic tire mounted thereon, and (v) a means for detachably fastening an automobile floor-type hydraulic jack to said frame;

(vi) wherein said pneumatic tires and said vertical support struts together provide a pneumatic mechanism for a smooth transition of the load transfer from said pneumatic tires in an unloaded condition, to the set of said vertical support struts in a loaded condition.

* * * * *